United States Patent
Overzier

(10) Patent No.: US 12,325,376 B2
(45) Date of Patent: Jun. 10, 2025

(54) METHOD FOR CONTROLLING A PEDAL LEVER OF A HYDRAULIC POWER BRAKE

(71) Applicant: Robert Bosch GmbH, Stuttgart (DE)

(72) Inventor: Frank Overzier, Tiefenbronn (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/551,007

(22) PCT Filed: Jul. 8, 2022

(86) PCT No.: PCT/EP2022/069133
§ 371 (c)(1),
(2) Date: Sep. 18, 2023

(87) PCT Pub. No.: WO2023/036497
PCT Pub. Date: Mar. 16, 2023

(65) Prior Publication Data
US 2024/0308458 A1    Sep. 19, 2024

(30) Foreign Application Priority Data

Sep. 9, 2021 (DE) ..................... 10 2021 209 950.5

(51) Int. Cl.
| | |
|---|---|
| B60R 21/09 | (2006.01) |
| B60T 7/06 | (2006.01) |
| B60T 11/28 | (2006.01) |
| B60T 13/14 | (2006.01) |

(52) U.S. Cl.
CPC ............... B60R 21/09 (2013.01); B60T 7/06 (2013.01); B60T 11/28 (2013.01); B60T 13/142 (2013.01)

(58) Field of Classification Search
None
See application file for complete search history.

(56) References Cited

U.S. PATENT DOCUMENTS

| | | | | |
|---|---|---|---|---|
| 4,653,813 A | * | 3/1987 | Burgdorf | ................ B60T 17/22 303/114.1 |
| 2006/0131953 A1 | * | 6/2006 | Nakayama | .............. B60T 8/885 303/122 |

FOREIGN PATENT DOCUMENTS

| | | |
|---|---|---|
| DE | 102014214786 A1 | 1/2016 |
| DE | 102018206586 A1 | 10/2019 |
| WO | 2019110332 A1 | 6/2019 |

OTHER PUBLICATIONS

International Search Report for PCT/EP2022/069133, Issued Oct. 19, 2022.

* cited by examiner

Primary Examiner — Vicky A Johnson
(74) Attorney, Agent, or Firm — NORTON ROSE FULBRIGHT US LLP

(57) ABSTRACT

A method for controlling a pedal lever of a hydraulic power brake for an at least partially automated mobile platform. In the method, the pedal lever acts mechanically on a master brake cylinder, and the pedal lever is mechanically coupled to an actuator. The method includes: providing a first signal to a control unit for the power brake for the purpose of controlling the pedal lever so as to move same into a passive position; establishing a first hydraulic connection between the master brake cylinder and a compensating volume; and transferring a first hydraulic volume of the master brake cylinder into the compensating volume by means of the actuator acting on the pedal lever in order to control the pedal lever so as to move same into a passive position.

15 Claims, 16 Drawing Sheets

METHOD FOR CONTROLLING A PEDAL LEVER OF A HYDRAULIC POWER BRAKE

BACKGROUND INFORMATION

In addition to stabilizing functions, for example in the form of a classic ESP/ABS function, current vehicle braking systems increasingly contain advanced functions, such as support for the driver or force application to the brake pedal during brake actuation by means of an electromechanical brake booster or also assisting or partially assisting functions by means of a unit for active modulation of the hydraulic brake pressure (for example: ESP, electromechanical brake booster, boost unit, etc.), without the active involvement of the driver.

Driver assistance systems are becoming increasingly widespread in today's motor vehicles in various degrees of sophistication. They intervene in the vehicle's drive, control (for example, steering) or signaling devices in a partially automated or automated manner, or warn the driver shortly before or during critical situations by means of suitable human-machine interfaces. Typically, a braking system has an electronic brake booster and an ESP system. In this combination, the majority of the braking system functions may be realized by means of an ESP system, and the brake booster is used as an external actuator to build up dynamic pressure.

SUMMARY

Braking systems can operate with closed hydraulics, i.e. a reservoir with hydraulic fluid of the braking system is only used for leakage and temperature compensation, such that an available hydraulic volume is constant. Examples include classic braking systems such as vacuum brake boosters, electromechanical brake boosters such as the iBooster, or a decoupled power brake (DPB) combined with an ESP system. Alternatively, braking systems can operate with open hydraulics, such as IPB systems (IPB: integrated power brake). In this case, a reservoir with hydraulic fluid may be used for intermediate storage of hydraulic volume during normal operation. Thus, the used hydraulic volume of the braking system may change in a braking operation. The respective braking systems have different disadvantages; for example, systems with closed hydraulics have the problem that a suction of an ESP system, depending on the operation, in the relevant region of the braking system, i.e. below the master brake cylinder to the brake cylinders on the wheels, have more hydraulic volume than should be present in normal operation.

Typically, power braking systems have a brake pedal coupled to a master brake cylinder by means of a pedal lever. During driver braking operations, the brake pedal is actuated, whereupon brake fluid, or brake hydraulic fluid, is displaced into a pedal force simulator in order to provide force feedback to the driver, thereby making the braking system more controllable.

In the case of highly automated driving, the brake pedal is not needed, since the vehicle controller requests deceleration independently. For this reason, efforts are being made to move the brake pedal in this case to a position where it does not interfere with the driver, for example, to allow more legroom for the driver. In this case, one solution may be to use an actuator to move the brake pedal to its end position, or a position of the brake pedal at maximum actuation. This then corresponds to a passive position of the pedal lever. However, the forces required for this are relatively high, because it would be necessary to work against the force of the simulator. In this case, decoupling the simulator from the hydraulic force flow can help lower the force level for the pedal movement.

According to aspects of the present invention, a method for controlling a pedal lever of a hydraulic power brake, a hydraulic power brake and a use of the hydraulic power brake, are provided. Advantageous embodiments of the present invention are disclosed herein.

Throughout this description of the present invention, the sequence of method steps is shown in such a way that the method is easy to understand. However, the person skilled in the art will recognize that many of the method steps can also be run through in a different order and result in the same or a corresponding result. In this sense, the sequence of the method steps can be changed accordingly. Some features are provided with numbers to improve readability or make the assignment clearer, although this does not imply a presence of certain features.

According to one aspect of the present invention, a method is provided for controlling a pedal lever of a hydraulic power brake for an at least partially automated mobile platform, wherein the pedal lever acts mechanically on a master brake cylinder, and the pedal lever is mechanically coupled to an actuator. According to an example embodiment of the present invention, in one step, a first signal for controlling the pedal lever so as to move same into a passive position is provided, in particular to a control unit for the power brake. In a further step, a first hydraulic connection is established between the master brake cylinder and a compensating volume. In a further step, a first hydraulic volume of the master brake cylinder is transferred into the compensating volume, by means of the actuator acting on the pedal lever, in order to control the pedal lever so as to move same into a passive position.

In particular, the pedal lever can act on at least one piston of the master brake cylinder, in order to displace the piston in the master brake cylinder for a braking effect.

In particular, the actuator may have an electric drive.

In particular, such a power brake may be designed in the form of a decoupled electric brake booster (DPB), wherein the driver applies the brakes during normal operation in a brake force link simulator and the actual brake pressure is generated by means of a plunger. This upstream pressure may be relayed to a vehicle dynamics control system via two brake lines.

In such a braking system, brake pressure can be built up with the plunger of the power brake, independently of the actuation of a brake pedal. In this case, the power brake can mainly take over a necessary dynamic build-up of a brake pressure. The vehicle dynamics control system can provide stabilization functions and any required emergency functions, such as a build-up of hydraulic brake pressure, in the event of a fault.

A driver of a vehicle with such a braking system does not notice this process, since in the case of the power brake a master cylinder may be decoupled with a pedal, or pedal lever, from the plunger, which is designed to build up a brake pressure.

The power brake may be designed to be coupled with a vehicle dynamics control system, in that a coupling valve of the power brake and a coupling valve of the vehicle dynamics control system are designed to be hydraulically coupled to one another. Such a hydraulic coupling between the power brake and the vehicle dynamics control system may be established by means of a coupling valve of the vehicle dynamics control system and a coupling valve of the power brake. In particular, the power brake can provide a hydraulic volume for the vehicle dynamics control system, such that when a first dynamic pressure is built up by the vehicle dynamics control system, the hydraulic volume remains constant in a system comprising the power brake and the vehicle dynamics control system. In other words, the power brake may control the hydraulic volume provided such that a sufficient hydraulic volume is provided to the vehicle dynamics control system, without adding additional hydraulic volume from an additional reservoir. That is, when a first dynamic pressure of the vehicle dynamics control system is reduced again, the power brake may be designed to receive the provided hydraulic volume again, without having to deliver it into the additional reservoir. In particular, the system comprising the power brake and the vehicle dynamics control system may be designed to transmit a signal to the power brake when the vehicle dynamics control system, such as a brake force modulation system, is activated, such that the power brake interacts hydraulically with the vehicle dynamics control system in such a way that a sufficient hydraulic volume is provided to the vehicle dynamics control system in order to build up a first hydraulic pressure without changing the hydraulic volume in the system comprising the power brake and the vehicle dynamics control system. In this way, it can be ensured that the hydraulic volume drawn in by the vehicle dynamics control system is provided from a plunger of the power brake and not from a hydraulic reservoir. In other words, the system may be designed such that information that the vehicle dynamics control system wants to draw in hydraulic volume is determined and transmitted to the power brake, whereupon the power brake plunger is actively controlled to build up a sufficient but low second hydraulic pressure, such that the hydraulic volume is not taken from a hydraulic reservoir, but from the plunger, since the second pressure generated by the power brake plunger is sufficiently high to avoid drawing from the hydraulic reservoir. This method of controlling the system results in a closed-loop hydraulic system when the first dynamic pressure of the vehicle dynamics control system is built up. Thus, there is no need to provide measures to transfer the drawn-in provided hydraulic volume back into the hydraulic reservoir, in order to ensure that there is no hydraulic pressure in the rest position of the system. This means that a plunger without snifting bores may also be used in this system, which among other things saves installation space, and in particular width for the system. This ensures that no pressure remains in the braking system after the brake is released or after operation of the vehicle dynamics control system, thus maintaining the functionality of the braking system.

In other words, the method for controlling the pedal lever of the hydraulic power brake may be used to decouple the pedal force simulator of the power brake, in order to enable or facilitate the maximum actuation of the pedal into an end position by the actuator.

In this case, the hydraulic decoupling of the pedal force simulator from the master cylinder significantly reduces the force required to actuate the pedal, allowing the actuator for the pedal movement to be designed more economically. In addition, the maximum pedal actuation into an end position of the pedal may be realized, because in normal active operation of the power brake typically only half a pedal travel is utilized, since only a first piston (MC1) of the master brake cylinder is displaced, from which the hydraulic volume acts on the brake force simulator. In active operation, a second hydraulic volume of the master brake cylinder remains closed, such that a second piston of the master brake cylinder cannot be displaced.

According to one aspect of the present invention, it is provided that the compensating volume, in particular for transferring the first hydraulic volume, is a hydraulic fluid reservoir of the power brake. Then, in a further step, at least a first hydraulic valve of the hydraulic power brake is opened, in order to form the first hydraulic connection between the hydraulic fluid reservoir and the master brake cylinder.

Alternatively or additionally, according to an example embodiment of the present invention, the hydraulic fluid reservoir may be an external device to the power brake.

Advantageously, the method according to this aspect of the present invention is simple and requires little effort to implement.

According to one aspect of the present invention, it is provided that the compensating volume is provided by means of a mechanical displacement of a piston of a plunger of the hydraulic power brake.

For this purpose, the piston of the plunger may be displaced from an initial position with the help of an electric drive, in order to provide the required hydraulic volume.

Advantageously, the method according to this aspect of the present invention may also be provided for power brakes that do not include a direct hydraulic connection between the master brake cylinder and the hydraulic fluid reservoir.

Advantageously, if no direct connection is available between the plunger and the hydraulic fluid reservoir, for example by means of a switching valve POV, or the switching of the switching valve is too noisy or associated with undesirable vibrations (noise vibration harshness (NVH)), or the outflow via the connection, for example via the switching valve, causes dynamic pressures that can lead to an unintended braking effect in the wheels, the brake fluid volume can be received by the plunger. For this purpose, the plunger may previously displace the amount of brake fluid to be received, via appropriately controlled valves, such as PSV, CSV and MC, into the hydraulic fluid reservoir.

According to one aspect of the present invention, it is provided that the piston of the plunger is controlled during the transfer of the hydraulic volume of the master brake cylinder such that a minimum overpressure value is not exceeded in the hydraulic connection between the master brake cylinder and the plunger.

Advantageously, the method according to this aspect of the present invention can limit an overpressure in the power brake to a maximum value during the control of the pedal lever.

According to one aspect of the present invention, it is provided that the actuator of the pedal lever has an electric drive.

For this purpose, the actuator itself may have an electric motor or other electric drive. Alternatively or additionally, the actuator may be operated hydraulically.

Alternatively or additionally, the pedal lever may be indirectly coupled to the actuator in that the master brake cylinder is configured with and/or coupled to the pedal lever, in particular via an actuating rod of the master brake cylinder, in such a way that the actuator acts on the pedal lever via the master brake cylinder, in order to displace the pedal lever into a fully actuated stop or end position.

According to one aspect of the present invention, it is provided that the pedal lever, in particular following one of the methods described above for controlling the pedal lever, is controlled so as to move from the passive position into a manual actuating position, by a second signal for controlling the pedal lever so as to move same into the actuating position being provided, in particular to the control unit for the power brake, in one step. This may be effected in particular by a control device of the mobile platform. In a further step, a second hydraulic connection is formed between the master brake cylinder and the hydraulic fluid reservoir by means of at least a second hydraulic valve of the hydraulic power brake. In a further step, a second hydraulic volume for the master brake cylinder is transferred from the hydraulic fluid reservoir by means of the actuator acting on the pedal lever, through the second hydraulic connection, in order to control the pedal lever so as to move same into the actuating position.

In particular, the second hydraulic connection may be the same as the first hydraulic connection and/or the second hydraulic valve may be the same as the first hydraulic valve.

In particular, the second hydraulic connection may be realized by means of at least one check valve and/or may be realized by means of a check valve of the plunger, and/or the second hydraulic valve may be designed in the form of seals of the master brake cylinder and/or of the plunger, which act in accordance with a check valve. In particular, such seals of the master brake cylinder and/or of the plunger may be lip seals that seal a hydraulic flow in only one direction.

According to one aspect of the present invention, it is provided that the second hydraulic connection between the master brake cylinder and the hydraulic fluid reservoir has a check valve.

According to one aspect of the present invention, it is provided that the check valve is designed as a seal of the master brake cylinder.

According to one aspect of the present invention, it is provided that the pedal lever is controlled so as to move from the passive position into the manual actuating position by the second signal for controlling the pedal lever so as to move same into the actuating position being provided, in particular to the control unit for the power brake, in one step. In a further step, a third hydraulic connection is formed between the master brake cylinder and the plunger by means of at least a third hydraulic valve of the hydraulic power brake. In a further step, the second hydraulic volume for the master brake cylinder is provided by means of a mechanical displacement of the piston of the plunger of the hydraulic power brake. In a further step, the second hydraulic volume is transferred to the master brake cylinder by means of the mechanical displacement of the piston of the plunger, and to the actuator acting on the pedal lever, in order to control the pedal lever so as to move same from the passive position into the actuating position.

Advantageously, this aspect of the method of the present invention has an advantage that it can be implemented in power brakes that do not have a check valve and lip seals. A further advantage of this aspect of the method is that a vacuum in the hydraulic power brake may be controlled in order to prevent brake pads of the brake from being retracted from a desired position. Alternatively, controlling the hydraulic pressure can accelerate the control of the pedal lever so as to move same from the passive position into the manual actuating position with a slight overpressure. The return force of the springs of the master brake cylinder may always be designed in such a way that the pedal lever always returns to its initial position due to the return force of the springs. These springs of the master brake cylinder may assist in controlling the pedal lever so as to move same from the passive position into the manual actuating position.

In this case, the first and/or the second and/or the third hydraulic connection may be identical. Furthermore, the first and/or the second and/or the third hydraulic valve may be identical.

According to one aspect of the present invention, it is proposed that the displacement of the piston of the plunger, during the provision of the second hydraulic volume to the master brake cylinder, is controlled such that a minimum overpressure is not exceeded in the third hydraulic connection between the master brake cylinder and the plunger.

For this purpose, according to an example embodiment of the present invention, a control unit of the power brake may be designed and configured to control the actuator and the piston of the plunger in such a way that no hydraulic overpressure occurs in the third hydraulic connection.

Alternatively or additionally, the control unit may be designed and configured to set a specific positive or negative pressure in the third hydraulic connection between the master brake cylinder and the plunger in substeps of the method.

To determine the pressure, the power brake may have a pressure sensor in the connection between the master brake cylinder and the plunger, which sensor provides a current hydraulic pressure to the control unit.

According to one aspect of the present invention, it is provided that the first signal for controlling the pedal lever so as to move same into the passive position and the second signal for controlling the pedal lever so as to move same into the actuating position are provided by a control device of a mobile platform.

The first control signal and/or the second control signal may be a binary signal and/or an analog signal.

According to an example embodiment of the present invention, a hydraulic power brake is provided, which has an actuator and a plunger and/or a hydraulic reservoir and a control unit. Furthermore, the hydraulic power brake has at least a first hydraulic valve and/or second hydraulic valve and may in particular have a pressure sensor. In this case, the control unit is configured to carry out one of the methods described above.

According to an example embodiment of the present invention, a use of a hydraulic power brake as described above for braking at least one wheel of a mobile platform is provided.

A mobile platform can be understood to be an at least partially automated system which is mobile, and/or a driver assistance system of a vehicle. An example can be an at least partially automated vehicle or a vehicle with a driver assistance system. That is, in this context, an at least partially automated system includes a mobile platform with respect to at least partially automated functionality, but a mobile platform also includes vehicles and other mobile machines including driver assistance systems. Other examples of mobile platforms may include multi-sensor driver assistance systems, multi-sensor mobile robots such as robotic vacuum cleaners or lawn mowers, a multi-sensor monitoring system, a manufacturing machine, a personal assistant or an access control system. Each of such systems can be a fully or partially automated system.

DETAILED DESCRIPTION OF EXAMPLE EMBODIMENTS

Exemplary embodiments of the present invention are illustrated with reference to the figures and are explained in more detail below.

DETAILED DESCRIPTION OF EXAMPLE EMBODIMENTS

Figure 1A:
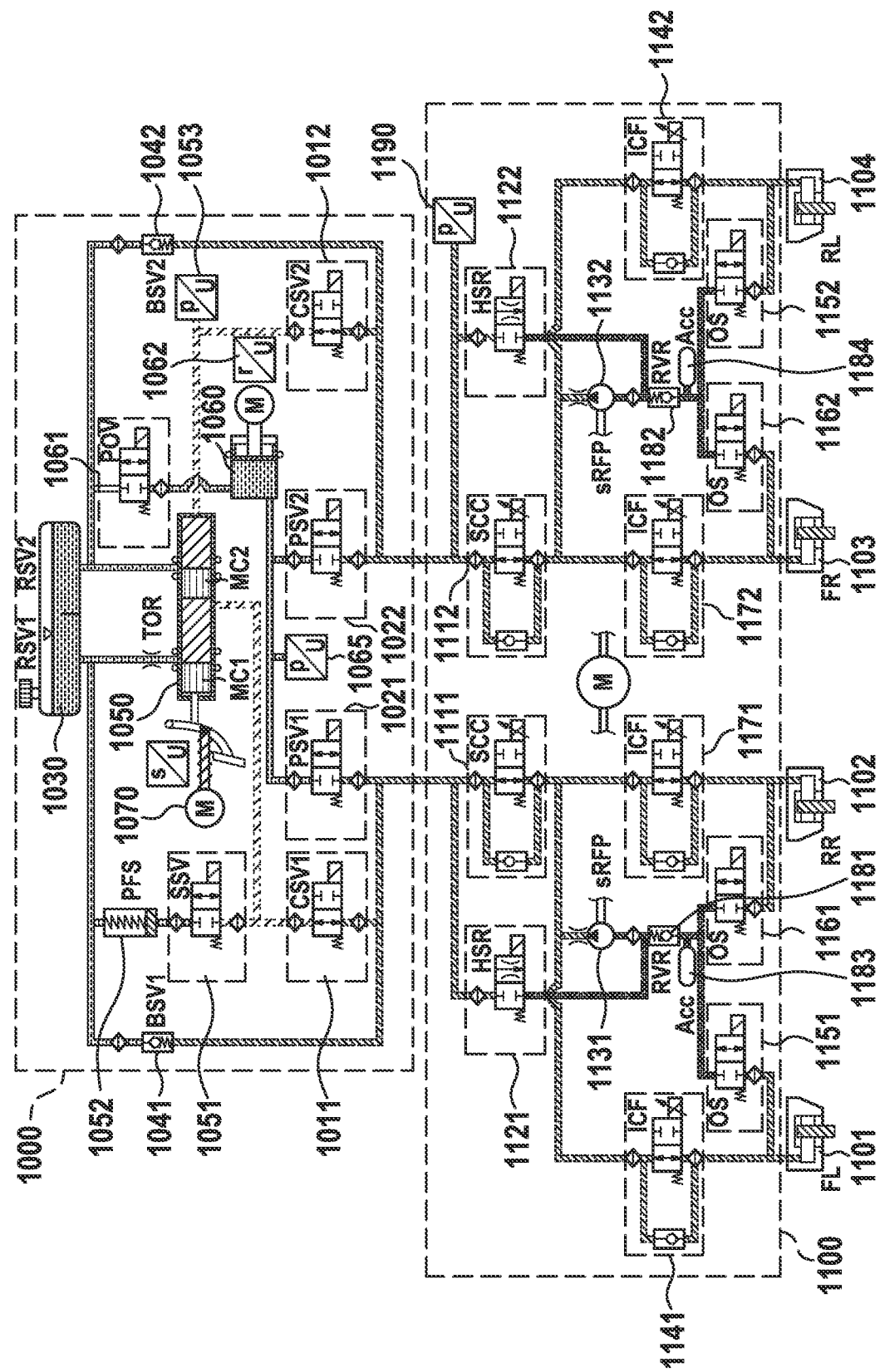
FIG. 1A shows a power brake with the pedal lever in an actuating position.

FIG. 1A schematically shows a power brake 1000 coupled to a vehicle dynamics control system 1100 and with valve positions in an idle state. The power brake 1000 is hydraulically coupled to the vehicle dynamics control system 1100 by means of a first and a second coupling valve of the power brake PSV 1, 2 1021 and 1022, respectively, and a first and second coupling valve of the vehicle dynamics control system SCC 1111 and 1112.

Both the power brake 1000 and the vehicle dynamics control system 1100 have a dual-circuit design.

A master cylinder 1050 may be manually actuated by a pedal, or with a pedal lever, which is mechanically connected to the master cylinder 1050, in order to hydraulically act on brake cylinders 1101, 1102, or 1103 and 1104 by means of a first and a second circuit separation valve CSV 1, 2 1011 and 1012, respectively, by means of respective associated circuits of the vehicle dynamics control system 1100, in order to provide an emergency braking effect. In this case, the master brake cylinder 1050 is hydraulically connected to a reservoir for hydraulic fluid 1030 by means of two snifter bores.

In normal operation, the braking effect on the brake cylinders 1101, 1102, or 1103 and 1104 may be effected by means of a plunger 1060, in that the plunger 1060 displaces hydraulic volume into the two circuits of the vehicle dynamics control system via the coupling valves of the power brake PSV 1, 2 1021 and 1022, respectively. The plunger 1060 may be hydraulically coupled to the hydraulic reservoir RSV 1, 2 1030 via a valve POV 1061. The plunger 1060 is coupled to an electric motor in order to deliver or receive hydraulic volume by means of a piston.

The electric motor may be controlled by a controller coupled to a sensor system for determining the electric motor position RPS 1062. The pressure of the master cylinder 1050 may be determined by means of a pressure sensor 1053.

The dual-circuit master cylinder 1050 may be hydraulically coupled to a brake force simulator PFS 1052 via a valve SSV 1051, in order to simulate hydraulic pressure buildup for a driver actuating the brake pedal. In this case, the hydraulic volume is then provided in normal operation by means of the plunger 1060 for the vehicle dynamics control system 1100, in order to provide a braking effect at the brake cylinders 1101, 1102, or 1103 and 1104, which are hydraulically coupled to the vehicle dynamics control system 1100. A mechanical position of the brake pedal may be determined by a displacement transducer s/U mechanically coupled to the brake pedal, or pedal lever, in order to control the plunger 1060.

A second hydraulic pressure generated by the plunger 1060 may be determined by a plunger pressure sensor 1065. A first check valve BSV 1, 2 1041 or 1042, respectively, may be used to supply hydraulic fluid to the hydraulic system consisting of the power brake 1000 and the vehicle dynamics control system 1100.

The power brake 1000 is hydraulically coupled to a coupling valve of the vehicle dynamics control system SCC 1111 or 1112 via the coupling valve of the power brake PSV 1, 2 1021 or 1022, respectively, thus forming a hydraulic coupling between the power brake 1000 and the vehicle dynamics control system 1100.

FIG. 1A thus shows the operating position of the pedal lever and the master brake cylinder 1050 of the power brake 1000 in a manual mode, along with the corresponding valve positions and hydraulic volumes that a driver may displace the master cylinder 1050 when actuating the pedal lever, in order to actuate the brake force simulator PFS 1052 when the valve SSV 1051 is open.

For a transition to automatic operation of the power brake 1000, in this manual mode, a signal may be provided to the power brake 1000 to control the pedal lever so as to move same into a passive position by means of an actuator 1070.

Figure 1B:
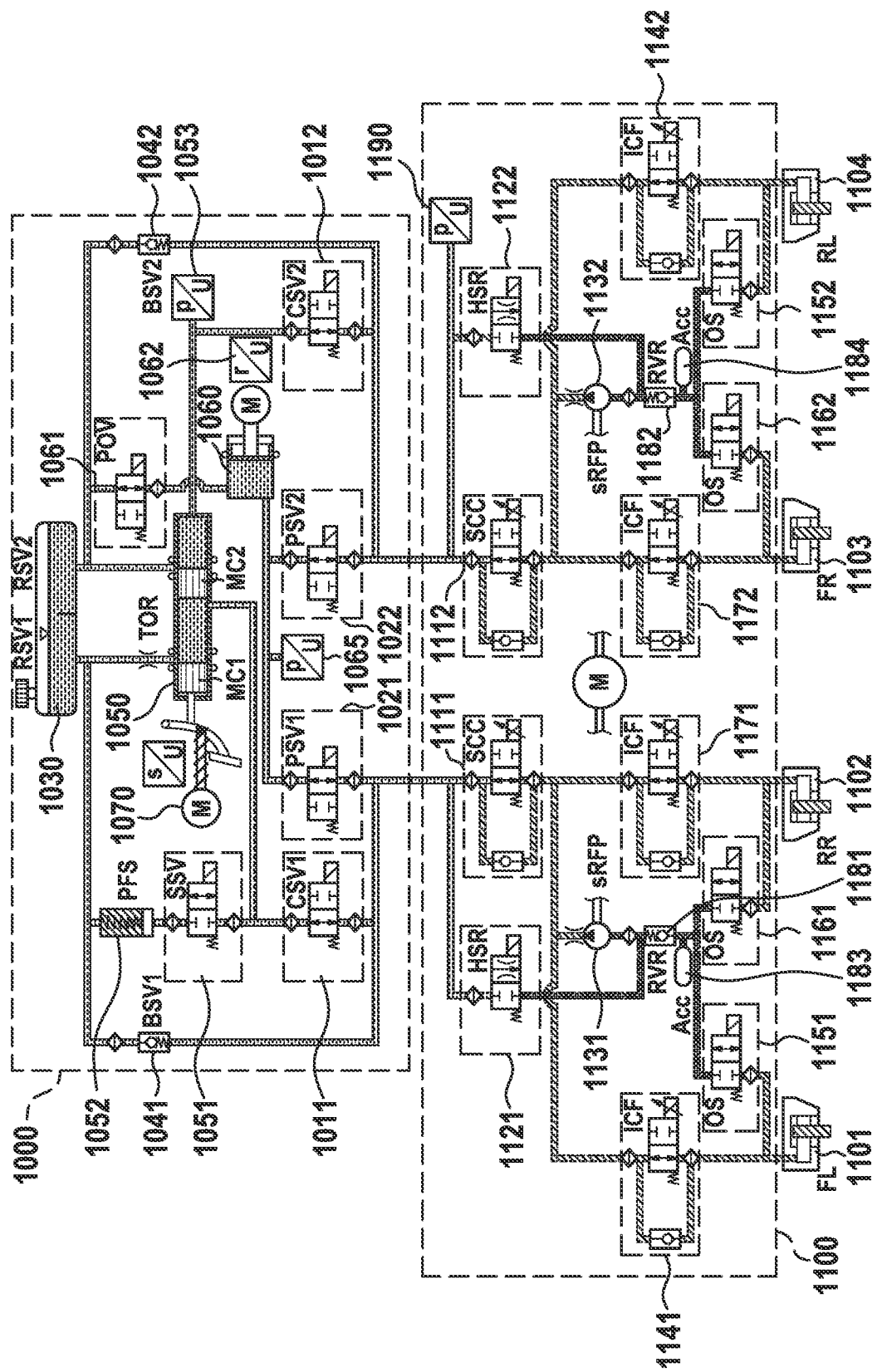
FIG. 1B shows valve positions of the power brake to control the pedal lever so as to move same into a passive position.

FIG. 1B schematically shows changed valve positions to displace the hydraulic volume from the master brake cylinder 1050 into a reservoir for hydraulic fluid 1030.

For this purpose, the first and the second circuit separation valve CSV 1, 2 1011 and 1012, respectively, along with the first and the second coupling valve of the power brake PSV 1, 2 1021 and 1022, respectively, a coupling valve POV 1061 of the plunger 1060 with the hydraulic reservoir RSV 1, 2 1030 are opened and the valve SSV 1051 to the brake force simulator PFS 1052 is closed.

In this case, the vehicle dynamics control system (ESP system) 1100 remains passive.

Figure 1C:
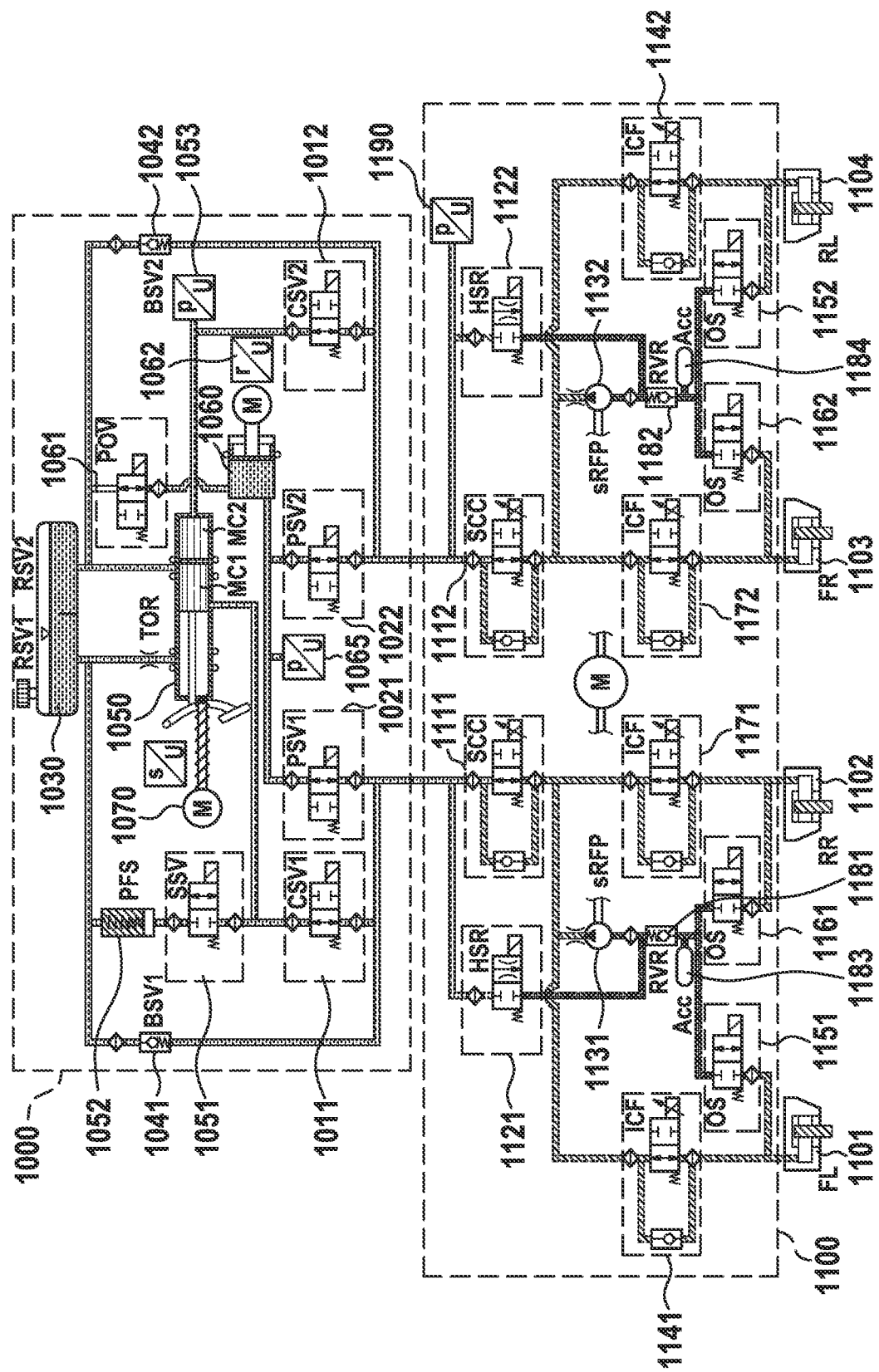
FIG. 1C shows a position of the master brake cylinder in the passive position.

FIG. 1C schematically shows how the actuator 1070 actuates the pedal lever to transfer hydraulic volumes MC1, MC2 from the master brake cylinder 1050 through the first and the second circuit separation valve CSV 1, 2 1011 and 1012, respectively, and the first and the second coupling valve PSV 1, 2 1021 and 1022, respectively, and the coupling valve POV 1061 into the reservoir for hydraulic fluid 1030. Thus, the actuator 1070 only needs to apply force to overcome a return spring of the master brake cylinder along with friction, since the master brake cylinder 1050 is decoupled from the brake force simulator PFS 1052.

Figure 1D:
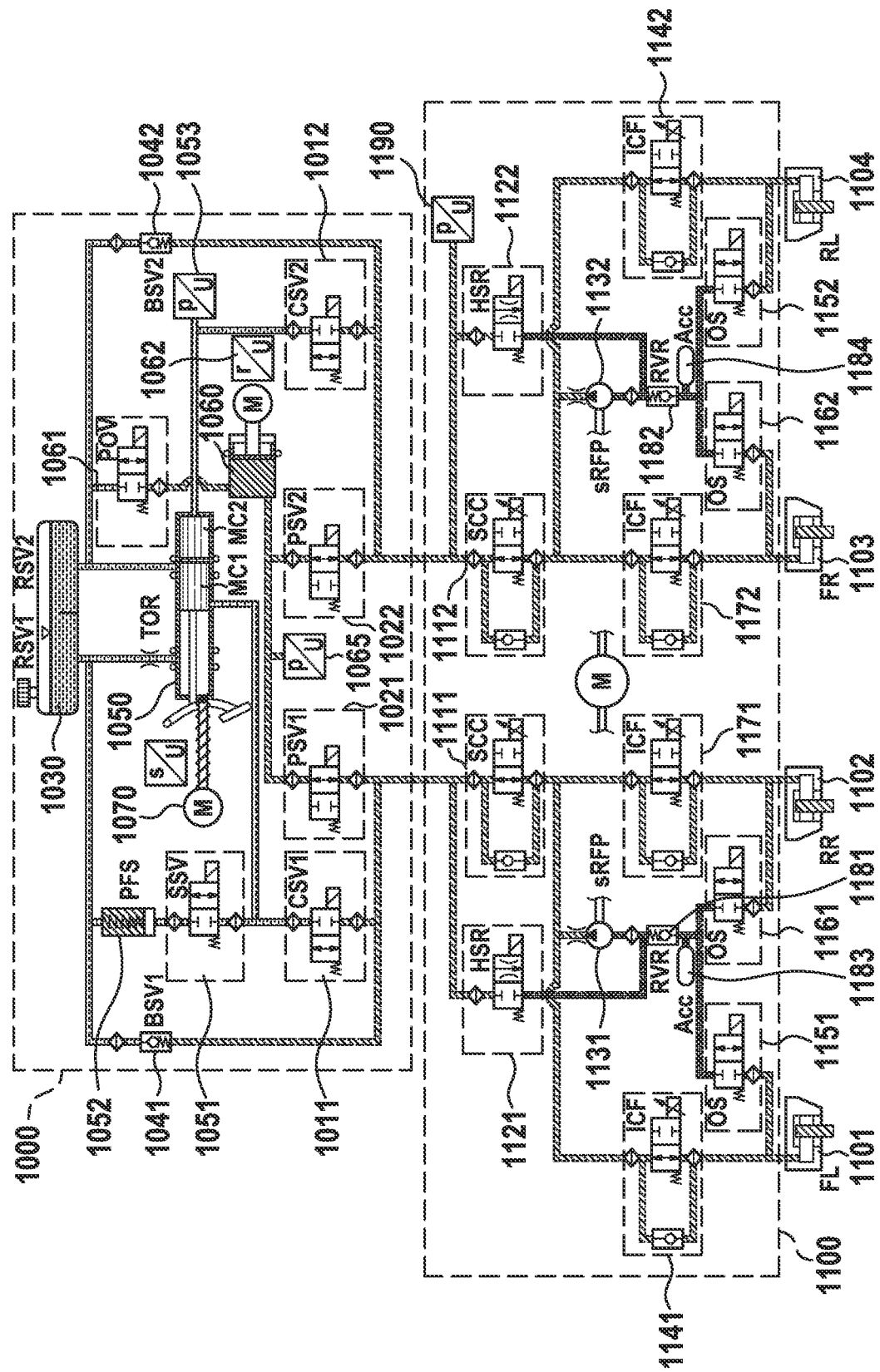
FIG. 1D shows valve positions of the power brake in the passive position.

FIG. 1D schematically shows the changed position of the tappets of the master brake cylinder 1050 in the passive position and the corresponding position of the pedal lever.

The valve positions of the power brake 1000 correspond to the initial state as shown in FIG. 1A.

After reaching the pedal end position in the passive position, the request of the AD driving mode is sent to the power brake 1050:

The power brake 1050 is returned to the full system mode after the pedal lever is controlled so as to move into the passive position, but the valve SSV 1051 to the brake force simulator PFS 1052 remains closed in the highly automated driving (AD driving) mode, since the brake force simulation that can be performed with the brake force simulator PFS 1052 is not needed in highly automated driving.

Figure 2A:
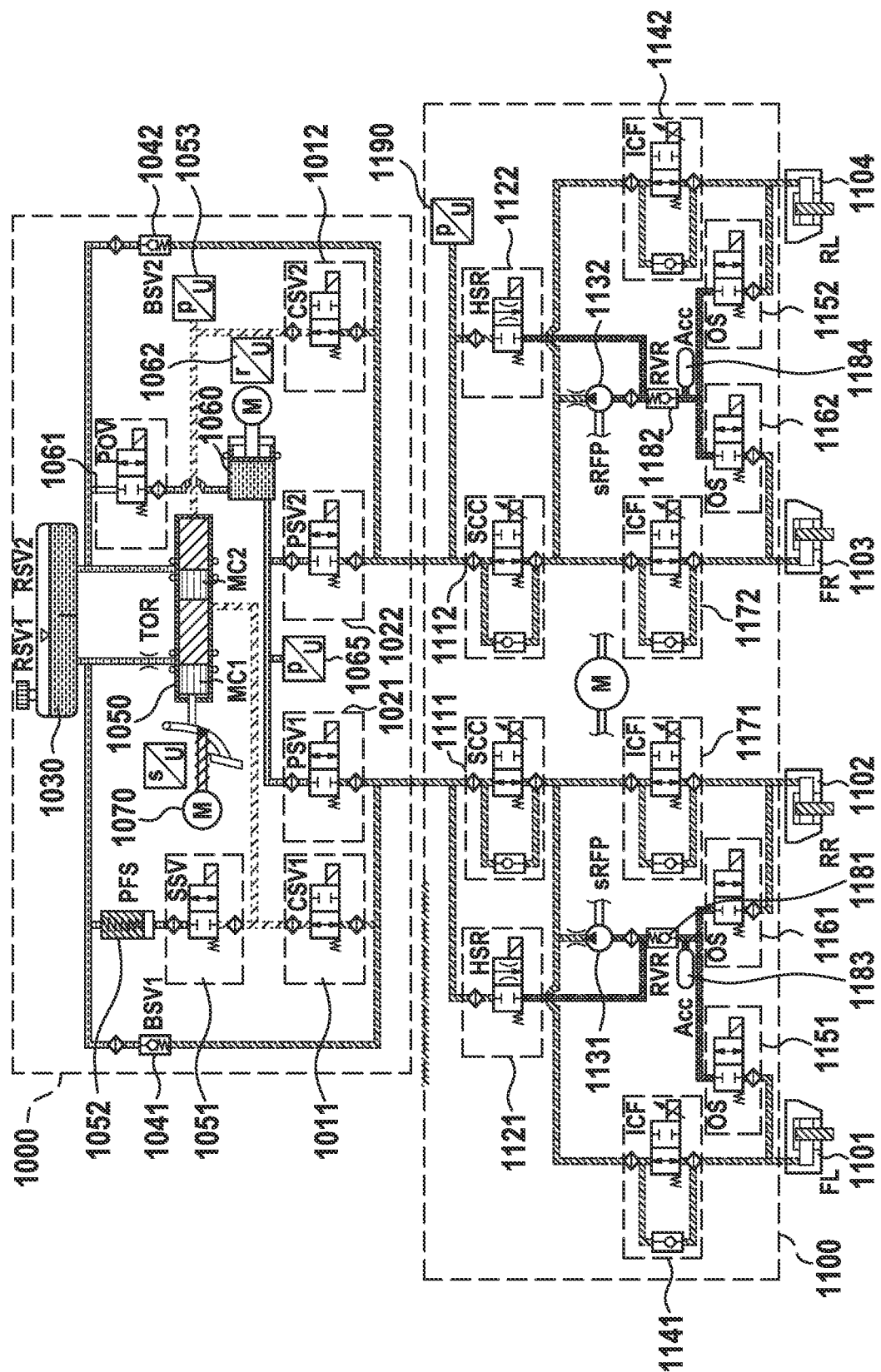
FIG. 2A shows a power brake with the pedal lever in an actuating position.

FIG. 2A schematically shows a second exemplary embodiment of the method for controlling the pedal lever.

The starting point for the method is the operating position of the pedal lever and the master brake cylinder 1050 according to the method described by FIG. 1A.

For a transition to automatic operation of the power brake 1000, in this manual mode, the power brake may be given a signal to control the pedal lever so as to move same into a passive position.

Figure 2B:
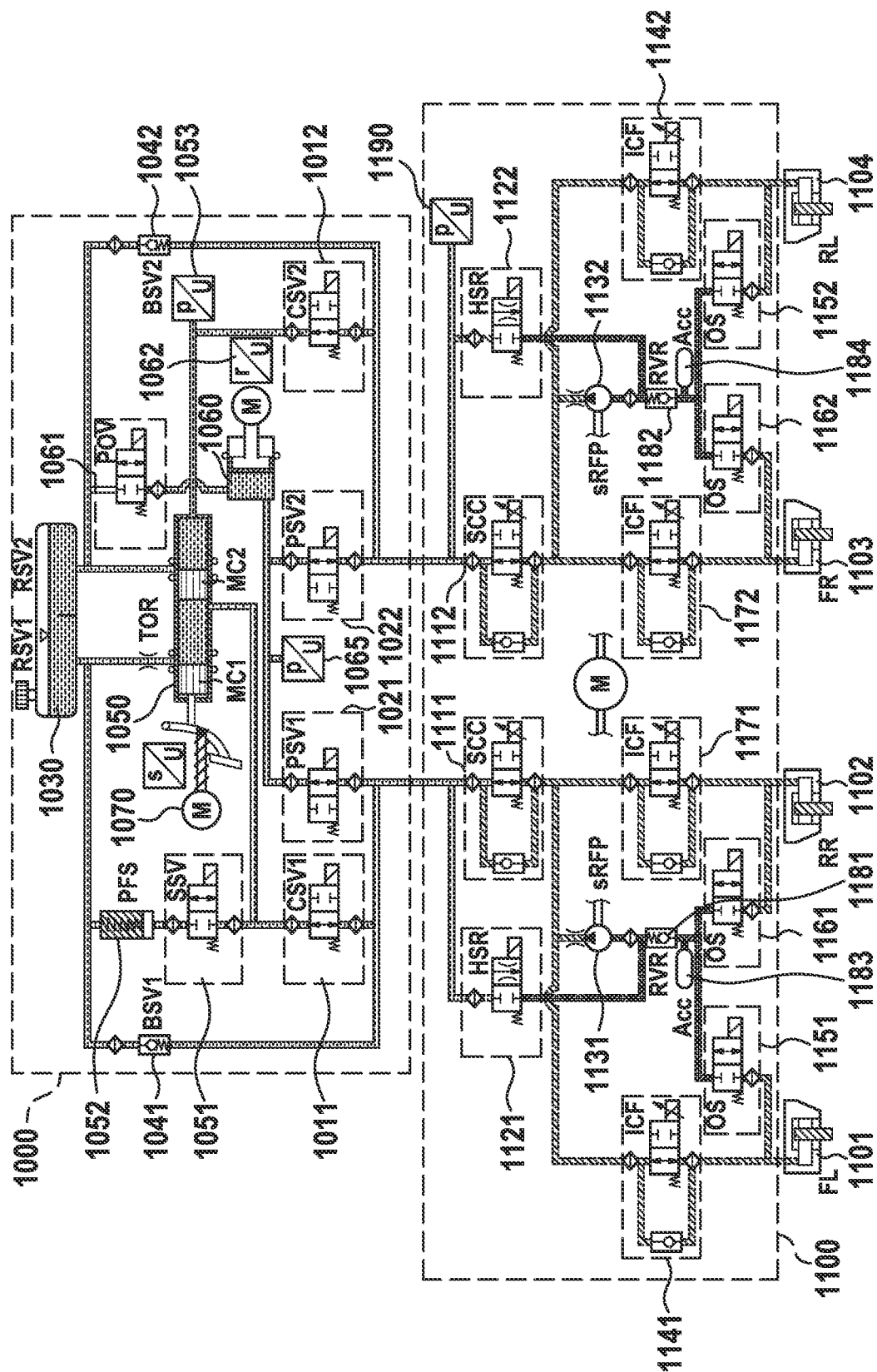
FIG. 2B shows a changed position of the plunger.

FIG. 2B schematically shows changed valve positions to displace the hydraulic volume from the master brake cylinder 1050 into a reservoir for hydraulic fluid 1030.

For this purpose, the first and second circuit separation valves CSV 1, 2 1011 and 1012, respectively, along with the first and second coupling valves of the power brake PSV 1, 2 1021 and 1022, respectively, are opened, and the valve SSV 1051 to the brake force simulator PFS 1052 and the coupling valve POV 1061 of the plunger 1060 to the hydraulic reservoir RSV 1, 2 1030 are or remain closed.

In this case, the vehicle dynamics control system (ESP system) 1100 remains passive. In a preparatory step, the piston of the plunger 1060 is displaced such that the plunger 1060 may receive hydraulic volume of the master brake cylinder 1050. Any excess hydraulic volume of the plunger 1060 generated thereby is transferred to the reservoir for hydraulic fluid 1030 through the first and the second circuit separation valve CSV 1, 2 1011 and 1012, respectively, and the first and the second coupling valve PSV 1, 2 1021 and 1022, respectively, and respective snifter bores of the master brake cylinder 1050.

Figure 2C:
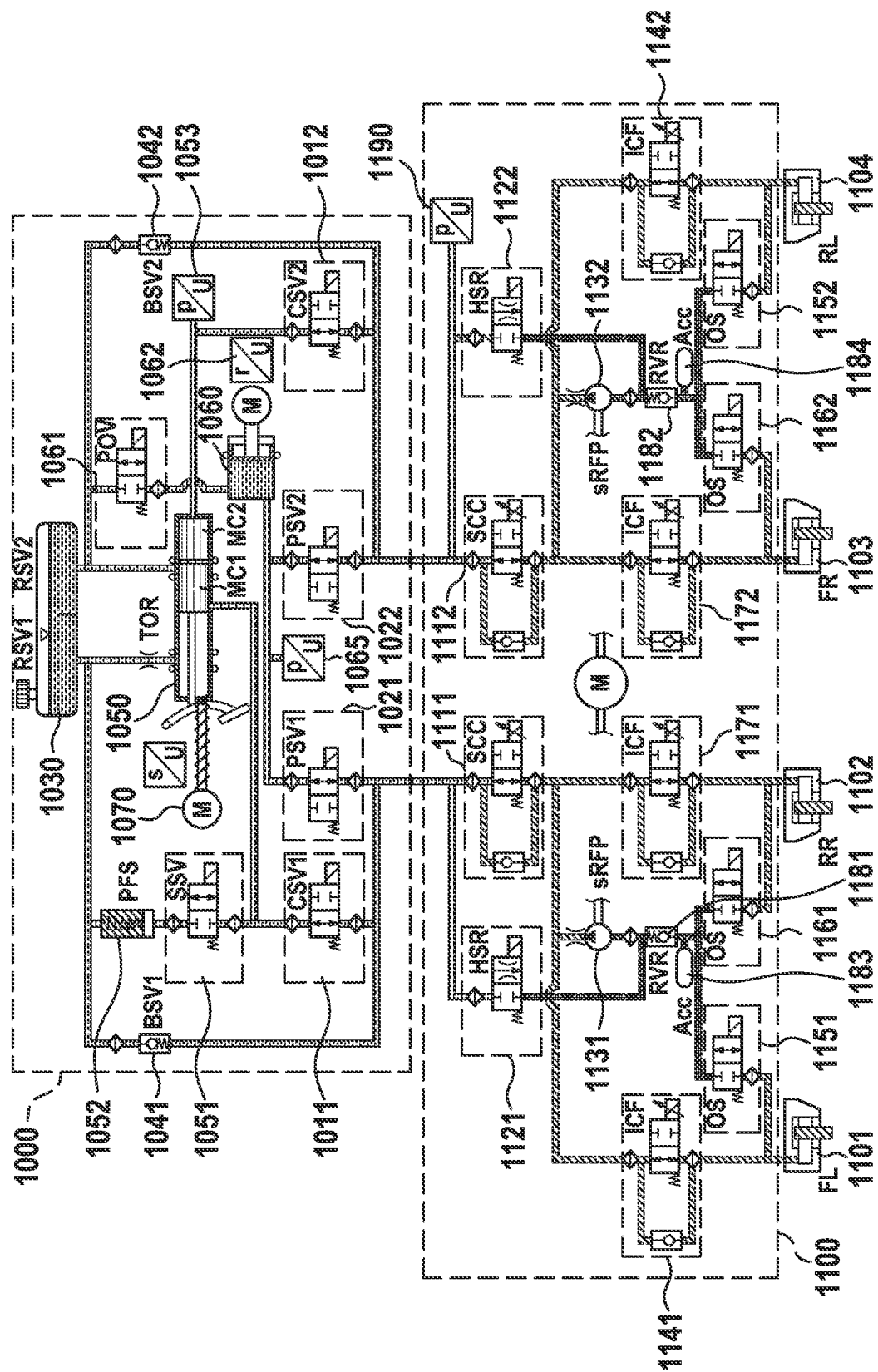
FIG. 2C shows a master brake cylinder and a plunger in a passive position.

FIG. 2C schematically shows how the hydraulic volumes MC1, MC2 of the master brake cylinder 1050 are transferred through the opened first and second circuit separation valves CSV 1, 2 1011 and 1012, respectively, along with the first and second coupling valves of the power brake PSV 1, 2 1021 and 1022, respectively, into the plunger 1060, wherein the piston of the plunger 1060 is controlled such that a minimum overpressure value is not exceeded in the hydraulic connection between the master brake cylinder 1050 and the plunger 1060.

Figure 2D:
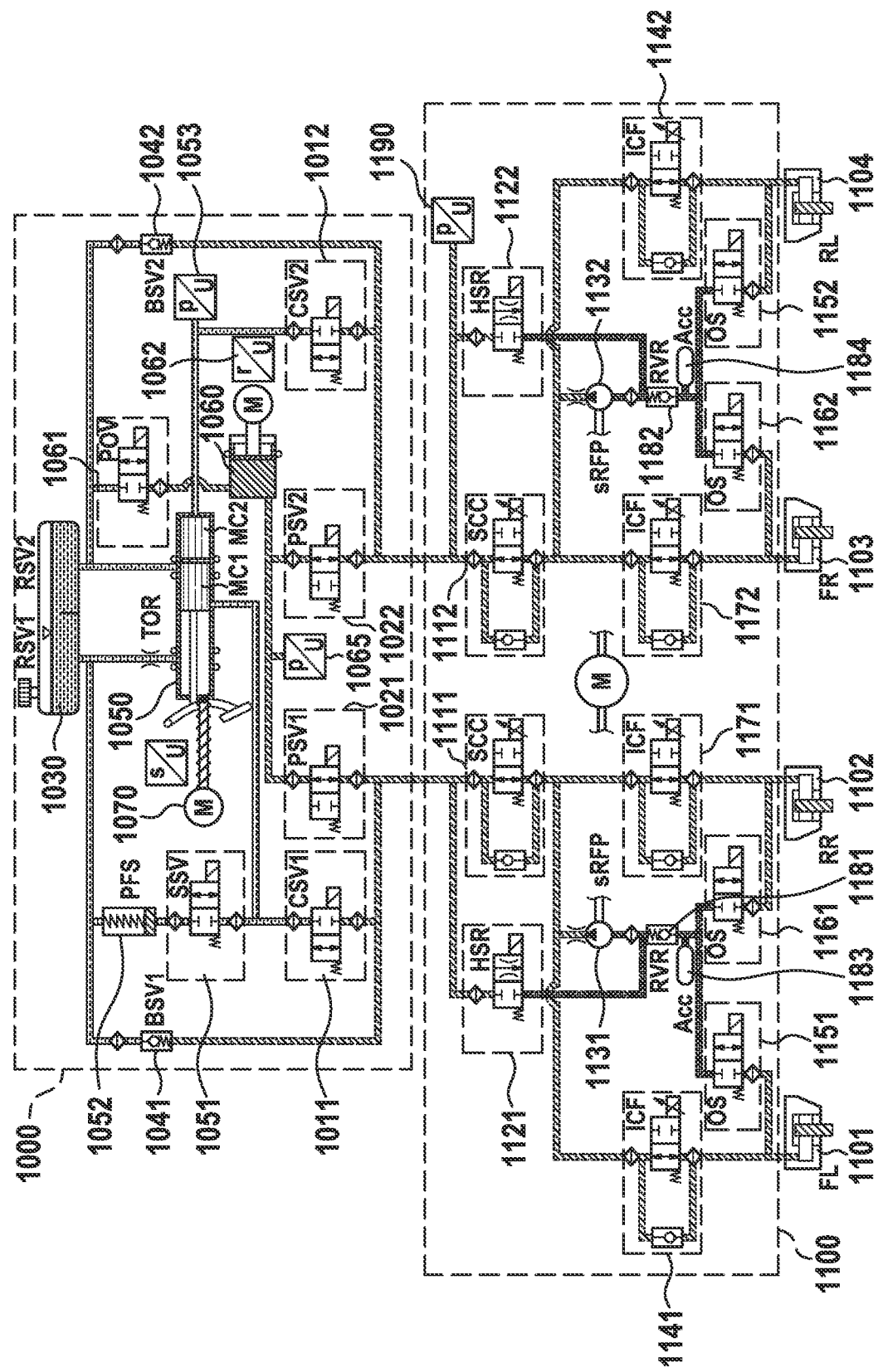
FIG. 2D shows valve positions of the power brake in the passive position.

Corresponding to FIG. 1D, FIG. 2D schematically shows the changed position of the tappets of the master brake cylinder 1050 in the passive position and the corresponding position of the pedal lever. The valve positions of the power brake 1000 correspond to the initial state as shown in FIG. 2A.

After reaching the pedal end position in the passive position, the request of the AD driving mode is sent to the power brake 1050:

The power brake 1050 is returned to the full system mode after the pedal lever is controlled so as to move into the passive position, but the valve SSV 1051 to the brake force simulator PFS 1052 remains closed in the highly automated driving (AD driving) mode, since the brake force simulation that can be performed with the brake force simulator PFS 1052 is not needed in highly automated driving.

Figure 3A:
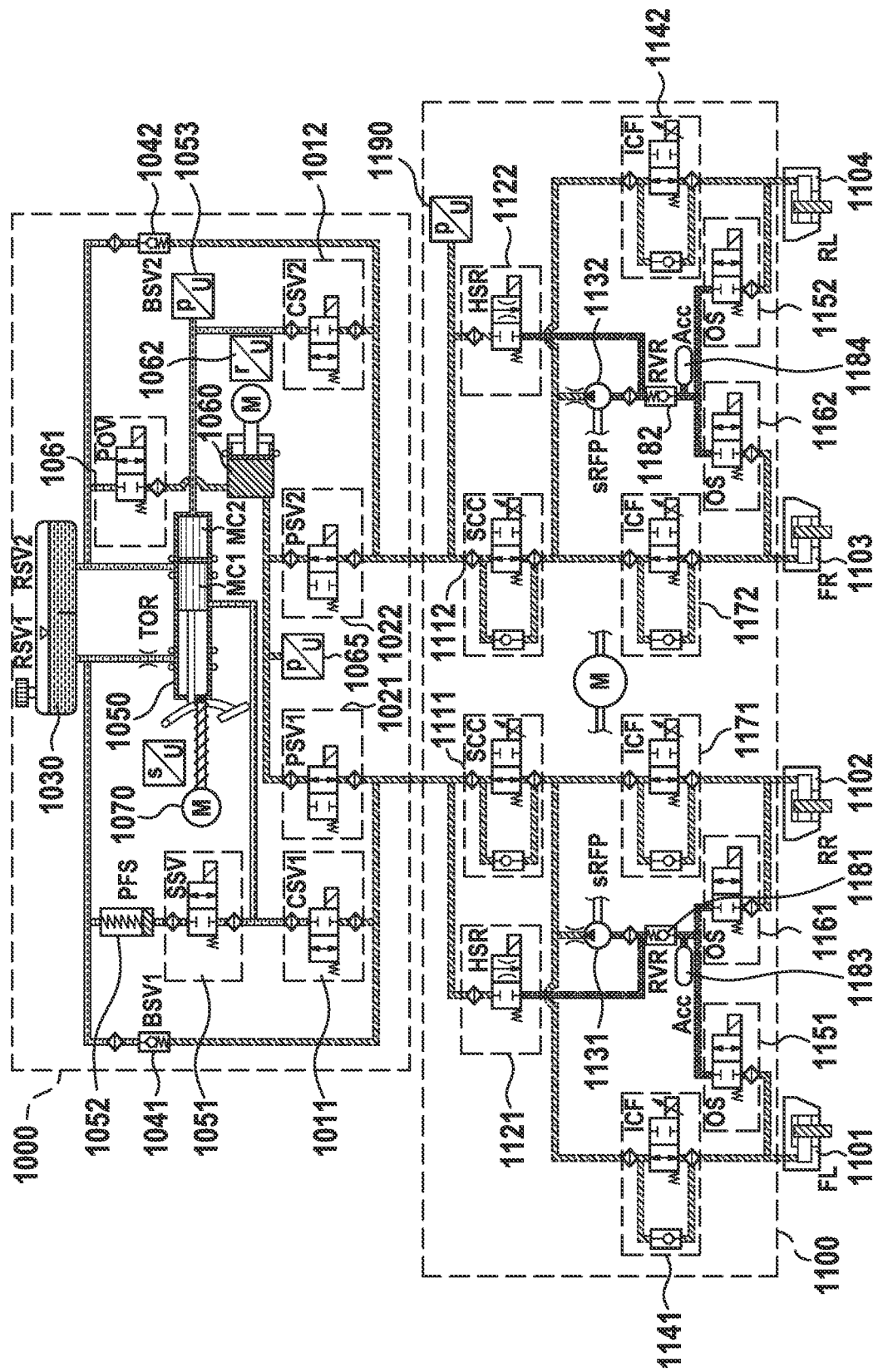
FIG. 3A shows a power brake with the pedal lever in a passive position.

FIG. 3A schematically shows a third exemplary embodiment of the method for controlling the pedal lever.

The starting point for the method is a passive position of the pedal lever and the master brake cylinder 1050 of the power brake 1000, which can be achieved by the methods described above for FIGS. 1A-1D and FIGS. 2A-2D.

For a transition to the manual operation of the power brake 1000, the power brake may be given a signal to control the pedal lever so as move same into an actuating position in this automatic operation.

Figure 3B:
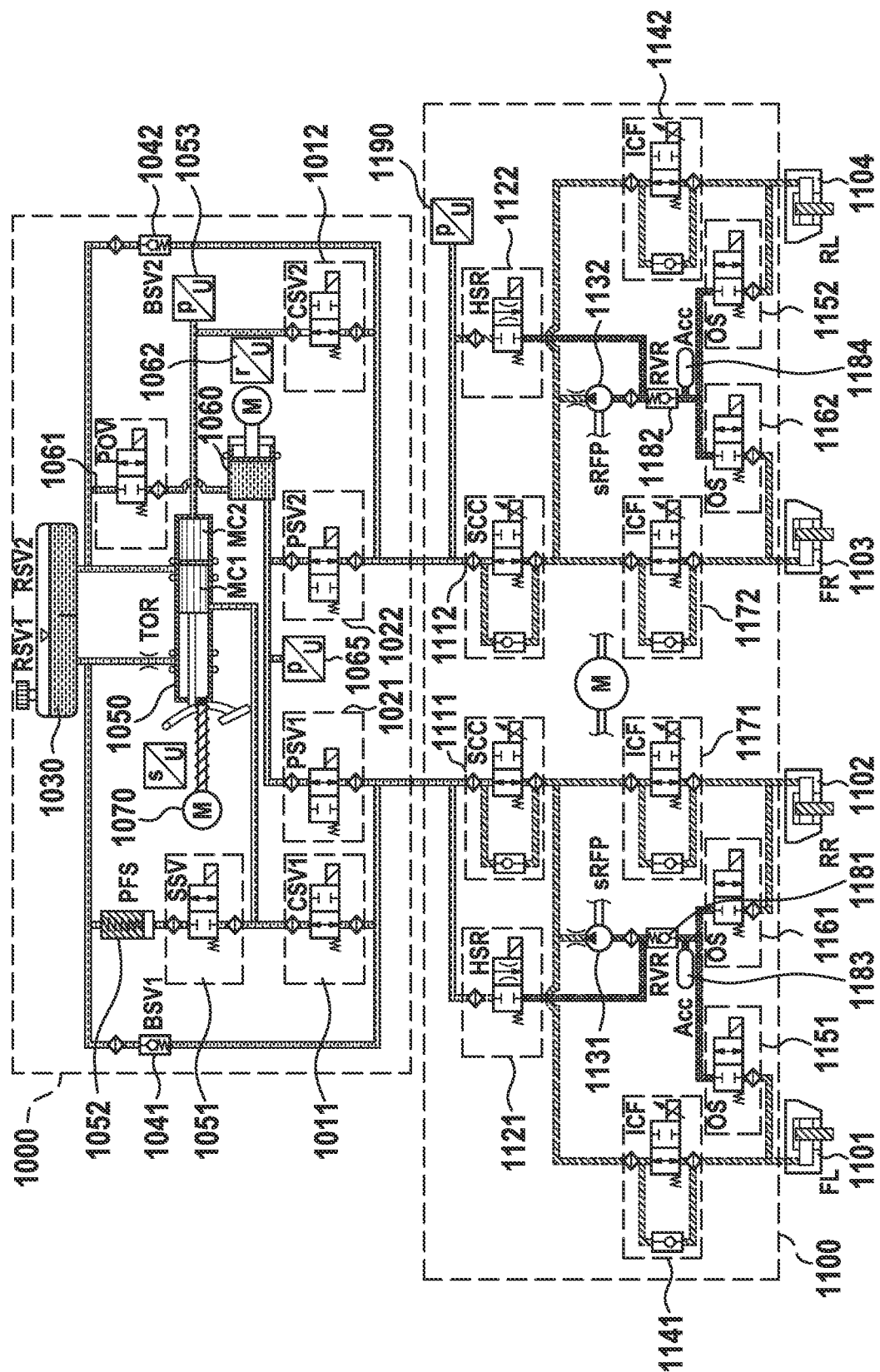
FIG. 3B shows valve positions to control the pedal lever so as to move same into an actuating position.

FIG. 3B schematically shows changed valve positions in order to transfer a required hydraulic volume into the master brake cylinder 1050 from the reservoir for hydraulic fluid 1030.

For this purpose, the first and second circuit separation valves CSV 1, 2 1011 and 1012, respectively, along with the first and second coupling valves of the power brake PSV 1, 2 1021 and 1022, respectively, are opened. The coupling valve POV 1061, which may hydraulically couple the plunger 1060 to the hydraulic reservoir RSV 1, 2 1030, and the valve SSV 1051 to the brake force simulator PFS 1052 are or remain closed.

In this case, the vehicle dynamics control system (ESP system) 1100 remains passive.

Figure 3C:
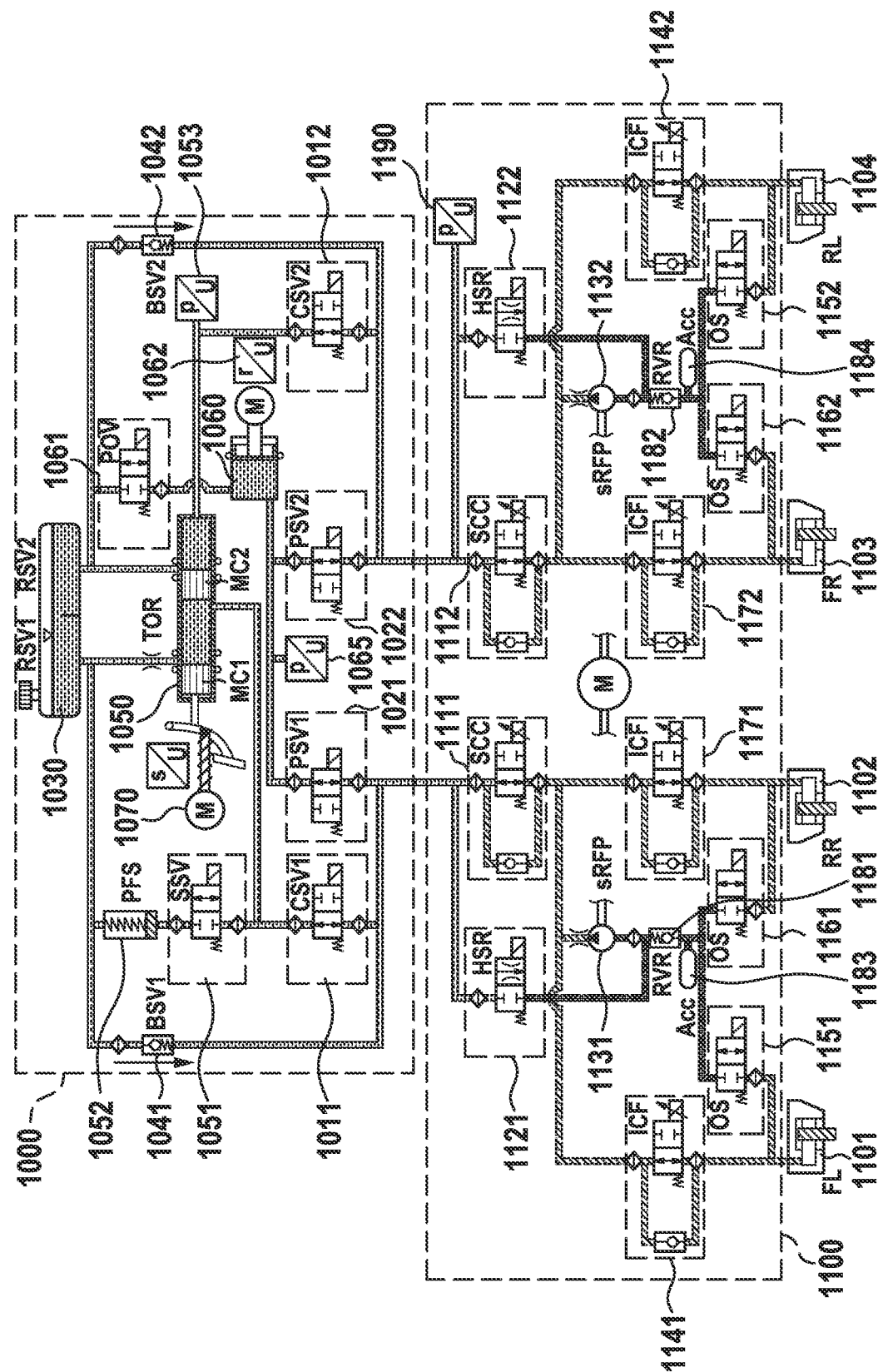
FIG. 3C shows a position of the master brake cylinder in the actuating position.

FIG. 3C schematically shows how the actuator 1070 actuates the pedal lever to transfer hydraulic volumes MC1, MC2 into the master brake cylinder 1050 through the first and second circuit separation valves CSV 1, 2 1011 and 1012, respectively, and the first and second check valves BSV 1, 2 1041 and 1042, respectively, into the reservoir for hydraulic fluid 1030. The actuator 1070 is supported by the return spring of the master brake cylinder.

Figure 3D:
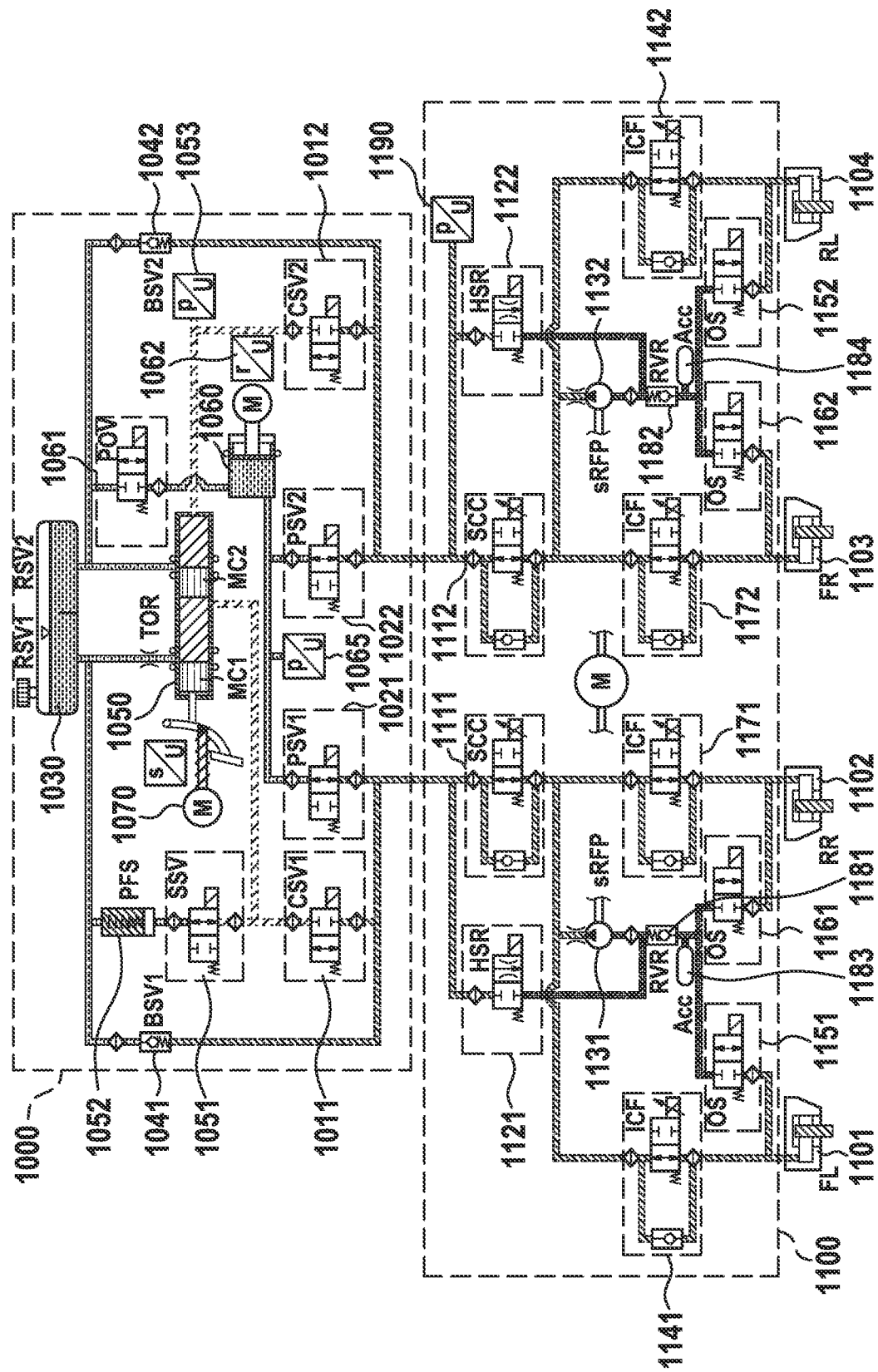
FIG. 3D shows the power brake with valve positions in the actuating position.

FIG. 3D schematically shows the changed position of the tappets of the master brake cylinder 1050 in the actuating position and the corresponding position of the pedal lever. The valve positions of the power brake 1000 correspond to the initial state as shown in FIG. 3A.

After reaching the pedal end position in the actuating position, the request of the manual driving mode is sent to the power brake 1050:

The power brake 1050 is returned to the full system mode after the pedal lever is controlled so as to move into the actuating position, and the valve SSV 1051 to the brake force simulator PFS 1052 may be opened manual mode in order to simulate a hydraulic pressure build-up for the driver actuating the brake pedal.

Figure 4A:
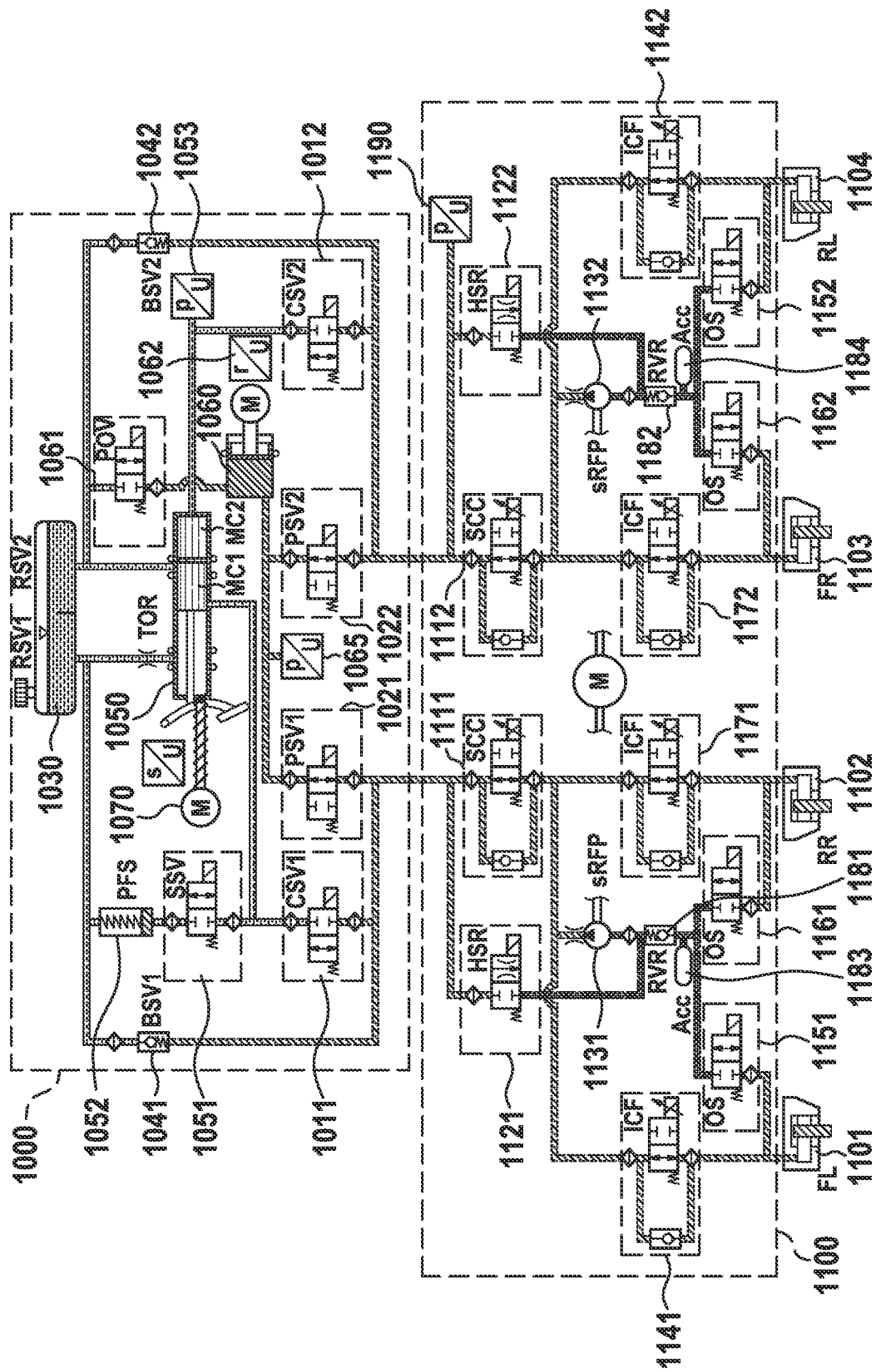
FIG. 4A shows a power brake with a pedal lever in a passive position.

FIG. 4A schematically shows a fourth exemplary embodiment of the method for controlling the pedal lever.

The starting point for the method is a passive position of the pedal lever and the master brake cylinder 1050 of the power brake 1000, which can be achieved by the methods described above for FIGS. 1A-1D and FIGS. 2A-2D.

For a transition to the manual operation of the power brake 1000, the power brake may be given a signal to control the pedal lever so as move same into an actuating position in this automatic operation.

Figure 4B:
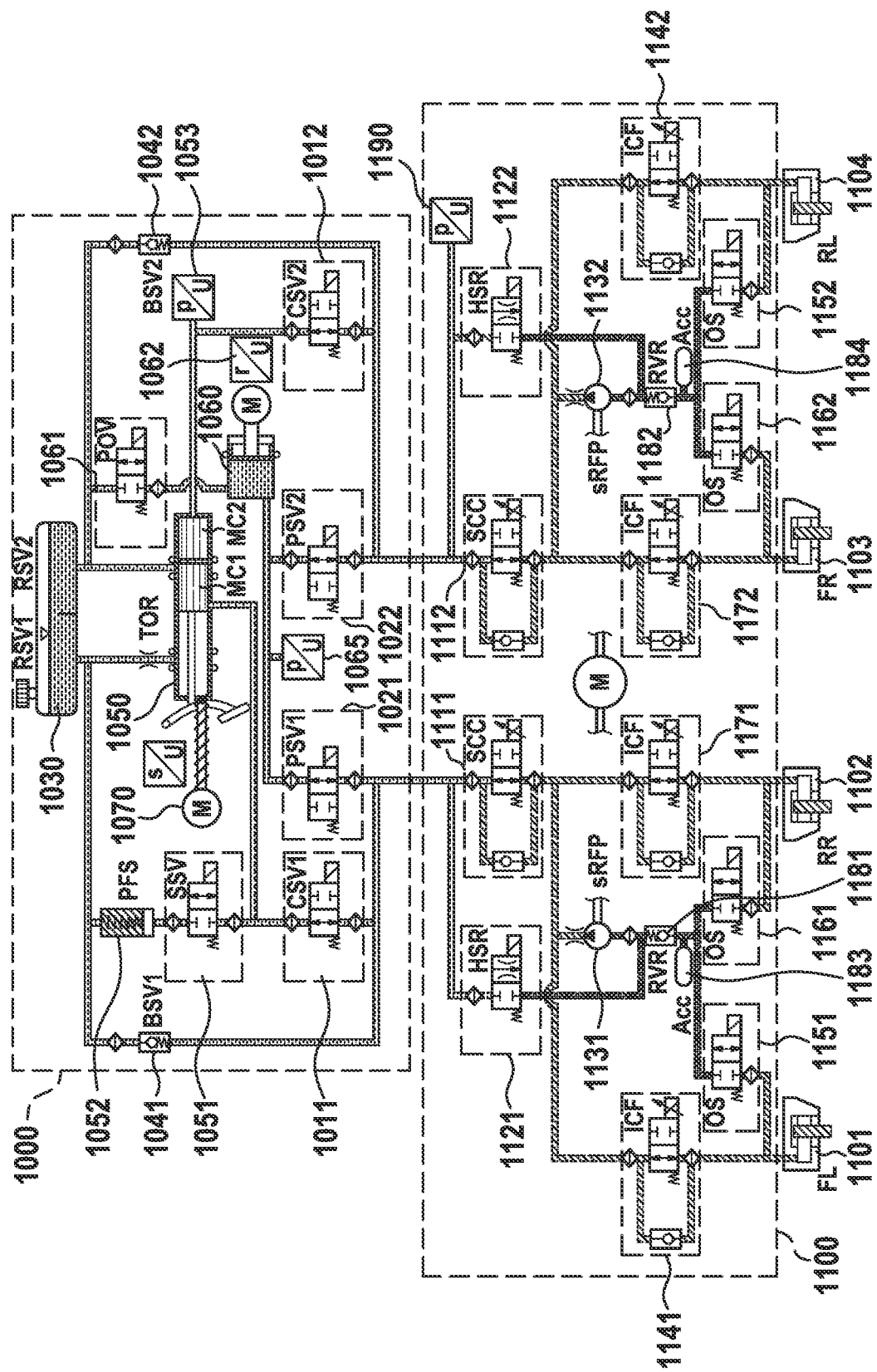
FIG. 4B shows valve positions to control the pedal lever so as to move same into an actuating position.

FIG. 4B schematically shows changed valve positions in order to transfer a required hydraulic volume into the master brake cylinder 1050 from the reservoir for hydraulic fluid 1030.

For this purpose, the first and the second circuit separation valve CSV 1, 2 1011 and 1012, respectively, along with the first and the second coupling valve of the power brake PSV 1, 2 1021 and 1022, respectively, are opened. The coupling valve POV 1061, which may hydraulically couple the plunger 1060 to the hydraulic reservoir RSV 1, 2 1030, and the valve SSV 1051 to the brake force simulator PFS 1052 are or remain closed.

In this case, the vehicle dynamics control system (ESP system) 1100 remains passive.

Figure 4C:
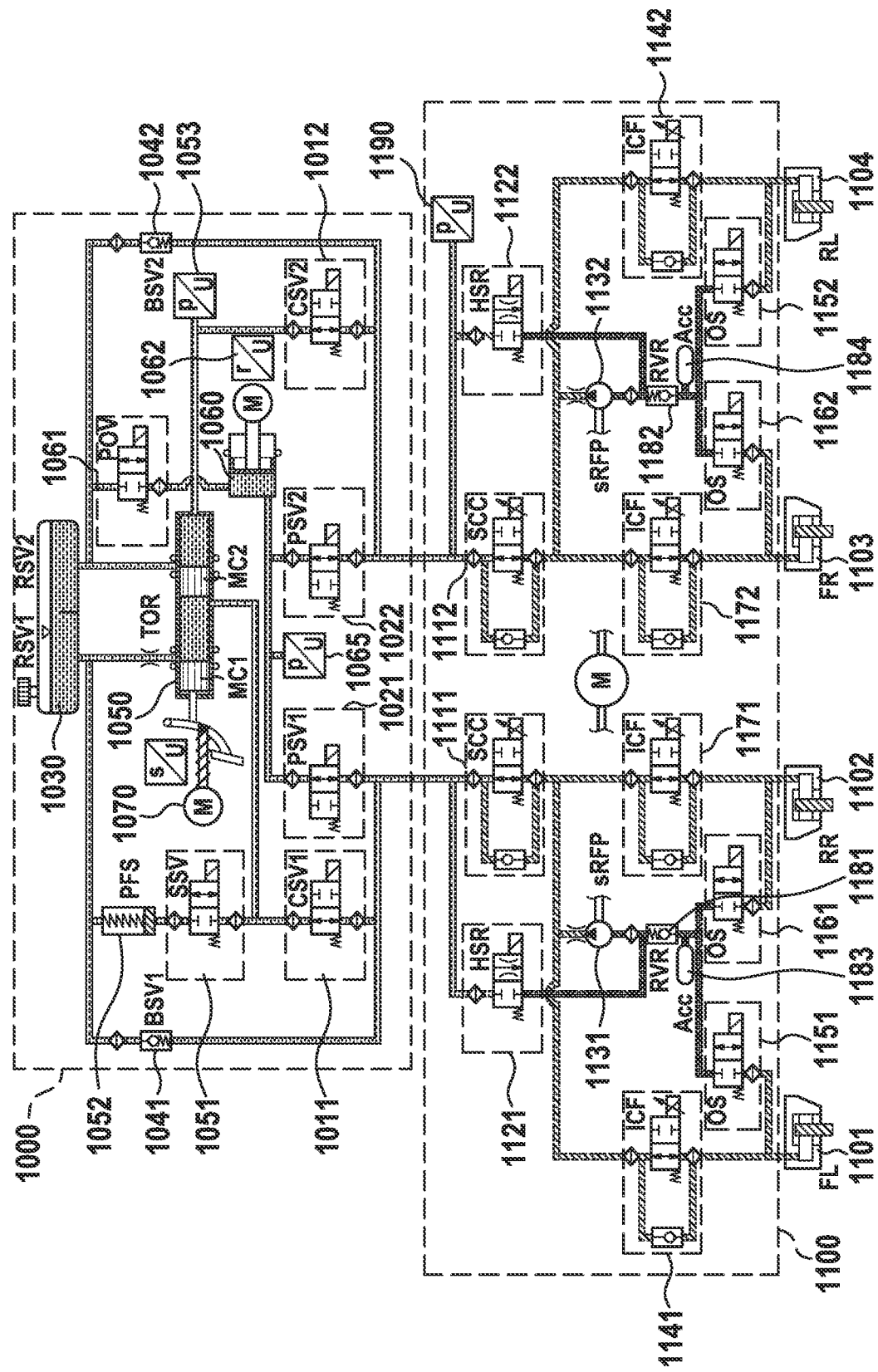
FIG. 4C shows a position of the plunger after transition of the master brake cylinder into the actuating position.

FIG. 4C schematically shows how the actuator 1070 actuates the pedal lever to transfer required hydraulic volumes MC1, MC2 for the master brake cylinder 1050, through the first and the second circuit separation valve CSV 1, 2 1011 and 1012, respectively, along with the first and the second coupling valve of the power brake PSV 1, 2 1021 and 1022, respectively, with a hydraulic volume, from the hydraulic volume of the plunger 1060, in which the piston of the plunger 1060 is moved accordingly. In this case, the piston of the plunger 1060 is controlled such that a minimum overpressure value is not exceeded in the hydraulic connection between the master brake cylinder 1050 and the plunger 1060.

The actuator 1070 is assisted by the return spring of the master brake cylinder to control the relevant piston of the master brake cylinder 1050 so as to move same into the actuating position. The piston of the plunger 1060 is returned to an initial position for activating the brake, in which the required hydraulic volume is transferred from the reservoir for hydraulic fluid 1030 through the first and second circuit separation valves CSV 1, 2 1011 and 1012, respectively, along with the first and second coupling valves of the power brake PSV 1, 2 1021 and 1022, respectively, and the snifter bores of the master brake cylinder 1050, which are unblocked in the actuating position.

Figure 4D:
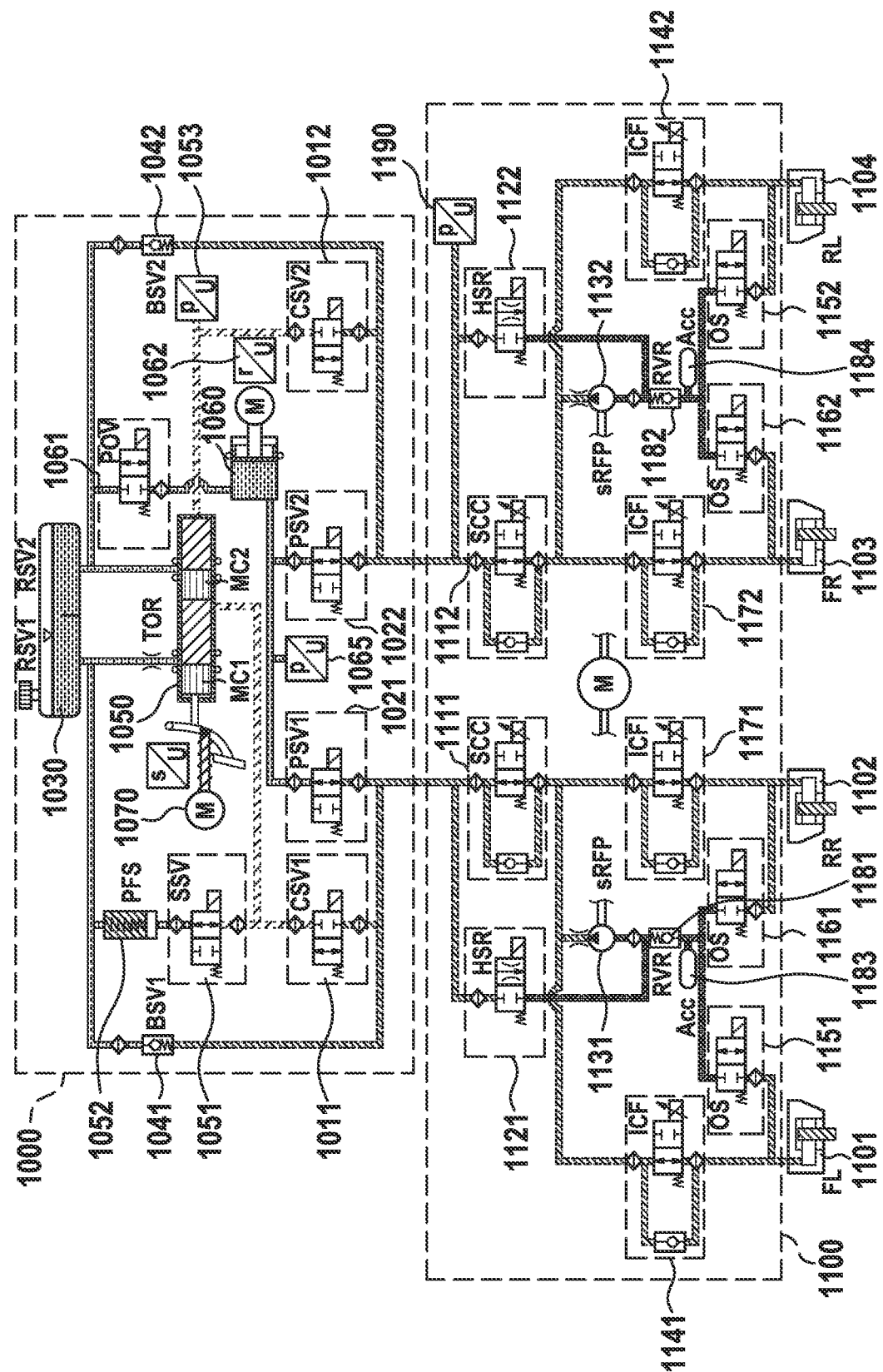
FIG. 4D shows the power brake with valve positions in the actuating position.

FIG. 4D schematically shows the changed position of the tappets of the master brake cylinder 1050 in the actuating position, and the corresponding position of the pedal lever. The valve positions of the power brake 1000 correspond to the initial state as shown in FIG. 4A.

After reaching the pedal end position in the actuating position, the request of the manual driving mode is sent to the power brake 1050.

The power brake 1050 is returned to the full system mode after the pedal lever is controlled so as to move into the actuating position, and the valve SSV 1051 to the brake force simulator PFS 1052 may be opened manual mode in order to simulate a hydraulic pressure build-up for the driver actuating the brake pedal.

The first hydraulic volume and/or the second hydraulic volume and/or the third hydraulic volume may be the same.

The invention claimed is:

1. A method for controlling a pedal lever of a hydraulic power brake for an at least partially automated mobile platform, wherein the pedal lever acts mechanically on a master brake cylinder, and the pedal lever is mechanically coupled to an actuator, the method comprising the following steps in a case of a first signal being provided to a control unit for the power brake to move the pedal lever into a passive position:
establishing a first hydraulic connection between the master brake cylinder and a compensating volume; and
transferring a first hydraulic volume of the master brake cylinder into the compensating volume by the actuator acting on the pedal lever to control the pedal lever to move into the passive position;
wherein the passive position is at least one of:
a predefined position of the pedal lever, the predefined position being predefined for an automated mode of the mobile platform, the first signal being provided when the mobile platform is to transition from a manual operating mode into the automated mode; and
a maximum depression position of the pedal lever.

2. The method according to claim 1, wherein the compensating volume is a hydraulic fluid reservoir of the power brake, and the method further comprises:
opening at least a first hydraulic valve of the hydraulic power brake to establish the first hydraulic connection between the hydraulic fluid reservoir and the master brake cylinder.

3. The method according to claim 2, wherein the pedal lever is subsequently controlled so as to move from the passive position into a manual actuating position, including, in a case of a second signal being provided to the control unit for the power brake to move the pedal lever into the manual actuating position:
establishing a second hydraulic connection between the master brake cylinder and the hydraulic fluid reservoir by at least a second hydraulic valve of the hydraulic power brake; and
transferring a second hydraulic volume for the master brake cylinder from the hydraulic fluid reservoir by the actuator acting on the pedal lever, through the second hydraulic connection, to control the pedal lever so as to move the pedal lever into the manual actuating position.

4. The method according to claim 3, wherein the second hydraulic connection between the master brake cylinder and the hydraulic fluid reservoir has a check valve.

5. The method according to claim 3, wherein the first signal for controlling the pedal lever so as to move the pedal lever into the passive position and the second signal for controlling the pedal lever so as to move the pedal lever into the manual actuating position are provided by a control device of the mobile platform.

6. The method according to claim 1, wherein the compensating volume is provided by a mechanical displacement of a piston of a plunger of the hydraulic power brake.

7. The method according to claim 6, wherein the piston of the plunger is controlled during the transfer of the first hydraulic volume of the master brake cylinder such that a minimum overpressure value is not exceeded in a hydraulic connection between the master brake cylinder and the plunger.

8. The method according to claim 1, wherein the passive position is the predefined position of the pedal lever that is predefined for the automated mode of the mobile platform, the first signal being provided when the mobile platform is to transition from the manual operating mode into the automated mode.

9. The method according to claim 1, wherein the passive position is the maximum depression position of the pedal lever.

10. A method for controlling a pedal lever of a hydraulic power brake for an at least partially automated mobile platform, wherein the pedal lever acts mechanically on a master brake cylinder, and the pedal lever is mechanically coupled to an actuator, the method comprising:
in a case of a first signal being provided to a control unit for the power brake to move the pedal lever into a passive position:
opening at least a first hydraulic valve of the hydraulic power brake to establish a first hydraulic connection between the master brake cylinder and a compensating volume; and transferring a first hydraulic volume of the master brake cylinder into the compensating volume by the actuator acting on the pedal lever to control the pedal lever to move into the passive position; and in a case of a second signal being provided to the control unit for the power brake to move the pedal lever into a manual actuating position subsequent to the movement of the pedal lever into the passive position:

establishing a second hydraulic connection between the master brake cylinder and the compensating volume by at least a second hydraulic valve of the hydraulic power brake; and transferring a second hydraulic volume for the master brake cylinder from the compensating volume by the actuator acting on the pedal lever, through the second hydraulic connection, to control the pedal lever to move into the manual actuating position;

wherein the method includes at least one of the following two features (I)-(II):

(I) the compensating volume is a hydraulic fluid reservoir, and the second hydraulic connection has a check valve that is in the form of a seal of the master brake cylinder; and (II) the compensating volume is provided by a mechanical displacement of a piston of a plunger of the hydraulic power brake, the second hydraulic volume is provided by a mechanical displacement of the piston, the transfer of the second hydraulic volume is made to the master brake cylinder by the mechanical displacement of the piston and to the actuator acting on the pedal lever, and the movement of the pedal lever into the manual actuating position is from the passive position and further includes opening a third hydraulic connection between the master brake cylinder and the plunger using at least a third hydraulic valve of the hydraulic power brake.

11. The method according to claim 10, wherein the compensating volume is the hydraulic fluid reservoir, and the second hydraulic connection has the check valve that is in the form of the seal of the master brake cylinder.

12. The method according to claim 10, wherein the compensating volume is provided by a mechanical displacement of a piston of a plunger of the hydraulic power brake, the second hydraulic volume is provided by a mechanical displacement of the piston, the transfer of the second hydraulic volume is made to the master brake cylinder by the mechanical displacement of the piston and to the actuator acting on the pedal lever, and the movement of the pedal lever into the manual actuating position is from the passive position and further includes opening the third hydraulic connection between the master brake cylinder and the plunger using the at least the third hydraulic valve of the hydraulic power brake.

13. The method according to claim 12, wherein the displacement of the piston of the plunger, while providing the second hydraulic volume to the master brake cylinder, is controlled such that a minimum overpressure value is not exceeded in the third hydraulic connection between the master brake cylinder and the plunger.

14. A hydraulic power brake system of an at least automated mobile platform, comprising:

a master brake cylinder;

an actuator;

a pedal lever that is mechanically coupled to the actuator and is configured to act mechanically on the master brake cylinder;

a control unit; and a valve system that includes at least one hydraulic valve;

wherein, in a case of a first signal being provided to the control unit for the power brake to move the pedal lever into a passive position, the control unit is configured to perform a control that includes:

using the valve system to establish a first hydraulic connection between the master brake cylinder and a compensating volume; and transferring a first hydraulic volume of the master brake cylinder into the compensating volume with the actuator acting on the pedal lever to control the pedal lever to move into the passive position;

wherein the passive position is at least one of:

a predefined position of the pedal lever, the predefined position being predefined for an automated mode of the mobile platform, the first signal being provided when the mobile platform is to transition from a manual operating mode into the automated mode; and a maximum depression position of the pedal lever.

15. The hydraulic power brake as recited in claim 14, wherein the hydraulic power brake is configured to brake at least one wheel of the mobile platform.

* * * * *